May 7, 1957  M. M. NEWMAN  2,791,684
NOISE GENERATORS
Filed March 20, 1953  2 Sheets-Sheet 1
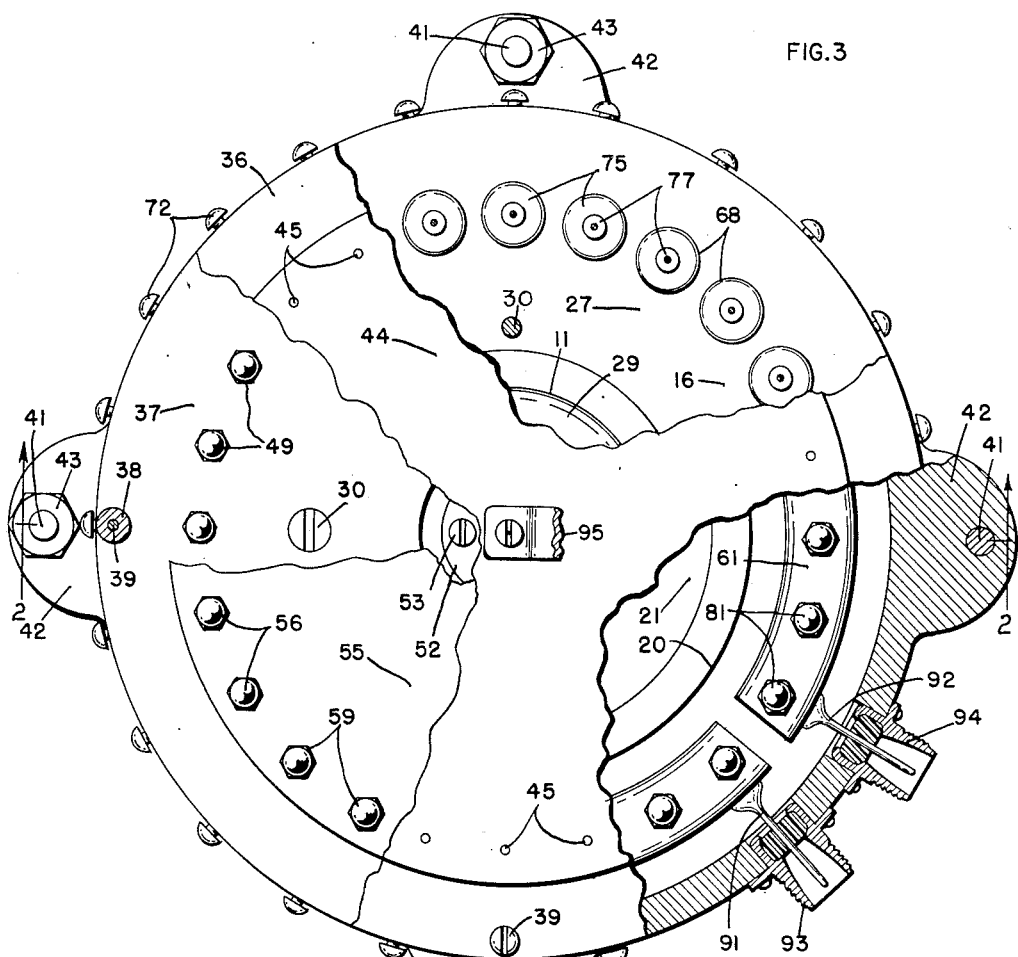
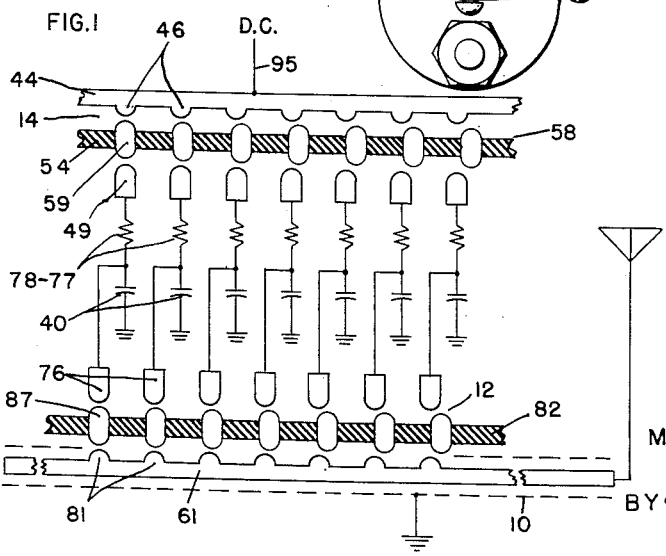
INVENTOR
MORRIS M. NEWMAN
BY Caswell & Lagaard
ATTORNEYS May 7, 1957  M. M. NEWMAN  2,791,684
NOISE GENERATORS Filed March 20, 1953　　2 Sheets-Sheet 2

INVENTOR
MORRIS M. NEWMAN
BY *Caswell & Lagaard*
ATTORNEYS

United States Patent Office 2,791,684
Patented May 7, 1957

2,791,684

NOISE GENERATORS

Morris M. Newman, St. Paul, Minn., assignor to Lightning & Transients Research Institute, Inc., Minneapolis, Minn., a corporation of Minnesota Application March 20, 1953, Serial No. 343,737

3 Claims. (Cl. 250—17)

The herein disclosed invention relates to noise generators and has for an object to produce a noise generator capable of generating electric pulses, the components of which have frequencies extending over a great range.

Another object of the invention resides in providing a noise generator in which the repetition rate of the pulses is extremely great.

A still further object of the invention resides in providing a noise generator having a large peak power output.

Another object of the invention resides in utilizing for the formation of the pulses a high speed differential switching mechanism.

A still further object of the invention resides in providing a construction by means of which the electric pulses are generated on a transmission line having a definite characteristic impedance.

Another object of the invention resides in providing a construction in which the inductive impedance of the discharge path is extremely low.

A further object of the invention resides in providing charging units in which condensers are charged and discharged and in which the charging process is separate from the discharge process.

An object of the invention resides in constructing the charging units with a resistance and a capacitor connected in parallel for determining the discharge rate and in utilizing one of the elements of the capacitor as one of the conductors of the circuit.

Other objects of the invention reside in the novel combination and arrangement of parts and in the details of construction hereinafter illustrated and/or described.

In the drawings:

Fig. 1 is a wiring diagram of a noise generator illustrating an embodiment of the invention.

Fig. 3 is a plan view of the generator shown in Fig. 2 with portions broken away to show the construction thereof.

Figure 2:
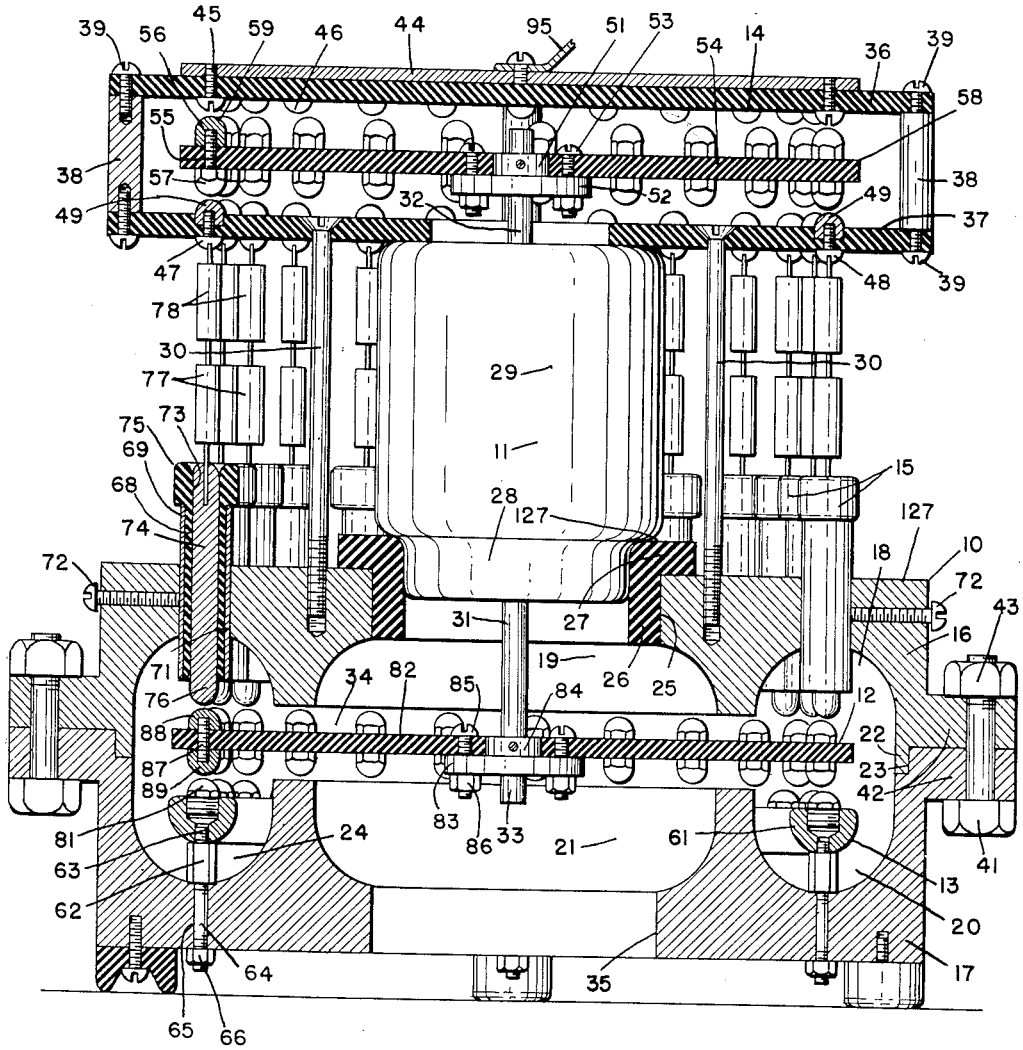
Fig. 2 is a longitudinal elevational sectional view of the noise generator taken on line 2—2 of Fig. 3.

The construction illustrated consists of a differential switching mechanism by means of which a number of resistor capacitor units are successively charged from a high voltage direct current source. In addition, a second differential switching mechanism is employed and by means of which the capacitors are successively discharged. The two switching mechanisms are so arranged that the charging process is separate from the discharge process. In conjunction with the second switching mechanism, a transmission line having a definite characteristic impedance is employed and to which charges from the capacitors are discharged thereby forming on the transmission line pulses of extremely short duration. The charging switch mechanism consists of a rotor having a plurality of circumferentially arranged and spaced connectors insulated from one another and movable past a different number of similarly arranged contacts on a distributor connected to the high voltage source. The connectors on the rotor successively move past a second group of contacts corresponding to the first group and connected to separate resistor capacitor units to successively charge the capacitors. The discharge switch mechanism is similarly constructed and successively discharges the condensers to the transmission line.

The invention comprises a housing 10 on which is supported an electric motor 11. Within the housing is mounted a discharge switch mechanism which is indicated by the reference numeral 12 and which is operated by the motor 11. Associated with the switch mechanism is a transmission line 13 of which said housing forms a part. Above the motor is a charging switch mechanism 14 also operated by the motor 11. Between the switch mechanisms 12 and 14 are disposed a number of charging units 15 and by means of which the transmission line 13 is charged with electric pulses. These parts will now be described in detail. A distributor 44 distributes the current to the various switch elements of the charging switch mechanism 14.

The housing 10 consists of two metallic castings 16 and 17 which are similarly constructed. The casting 16 has an annular cavity 18 extending about the outermost portion thereof and a central cavity 19. The casting 17 is similarly constructed with an annular cavity 20 and a central cavity 21. The cavities 18 and 20 register with one another to provide a toroidal shaped groove indicated in its entirety by the reference numeral 24. The two castings 16 and 17 are so constructed that a slit 34 is formed between these two castings at the locality of the toroidal shaped groove 24 and which brings said groove into communication with the cavities 19 and 21. The two castings overlie one another and are held in proper relation by means of an annular tongue 22 on the casting 16 which is received in an annular groove 23 in the casting 17. The castings 16 and 17 are clamped together by means of bolts 41 which extend through ears 42 on said castings. Nuts 43 on said bolts hold the parts in position.

Centrally located within the casting 16 and communicating with the cavity 19 is a bore 25. In this bore is received a bushing 26 constructed of insulating material and having a flange 27 at the uppermost portion thereof and resting on the upper surface 127 of casting 16. This bushing receives a portion 28 of the housing 29 of motor 11. Motor 11 is of conventional construction and is provided with an armature shaft 31 having an upper extension 32 and a lower extension 33. The motor is vertically arranged and the shaft 31 is vertically disposed with the extension 33 entering into the cavities 19 and 21 of the castings 16 and 17. Casting 17 is formed with a bore 35 similar to the bore 25 in casting 16 whereby the said castings form an annular construction.

Overlying the motor 11 are two plates 36 and 37 of insulating material which are held in spaced relation by means of a number of posts 38 disposed therebetween. Screws 39 extending through these plates are screwed into said posts and support the parts in proper position. Screws 30 extend through the plate 37 and are screwed into the casting 16 to secure the parts together.

The charging switch mechanism 14 utilizes the two plates 36 and 37. Overlying the plate 36 is a disc 44 of metal which forms the distributor of the invention and which is tapped to receive a number of screws 45 whose heads 46 project below the plate 36 and serve as contacts or switch elements for the said switch mechanism. These screws are arranged in circular formation concentric with the axis of the shaft 31 of motor 11. In the particular embodiment of the invention illustrated, there are 24 such screws equally spaced in a circumferential direction. Mounted on the plate 37 are similar screws 47 which are disposed opposite the screws 45. These screws have heads 48 which are disposed below the plate and form terminals. Nuts 49 disposed above the plate 37 and screwed on said bolts serve as contacts or switch elements of the switch mechanism 14.

Mounted on the extension 32 of the shaft 31 is a bushing 51 which has a flange 52 projecting outwardly therefrom. This flange has bolted to it by means of bolts 53 a disc 54 of insulated material. This disc is slightly greater in diameter than the circle formed by the screws 45 and 47 and has mounted on it screws 55. These screws are arranged in the form of a circle concentric with the axis of the shaft 31 of motor 11 of the same diameter as the circles of the screws 45 and 47. Nuts 56 and 57 are screwed on these screws and engage the upper and lower surfaces of the disc 54. In the form of the invention shown there are 23 of the screws 55, being one less than the number of contacts or screws utilized on the plates 36 and 37. The disc 54 is disposed midway between the plates 36 and 37 and together with the screws and nuts mounted thereon forms a rotor indicated in its entirety by the reference numeral 58. The nuts 56 are of special construction of the shape shown having rounded ends and being of a length such that the said nuts just clear the heads 46 of the screws 45 and the nuts 49 for the screws 47. These nuts and screws form connectors indicated by the reference numeral 59, and which bridge the space between the contacts or switch elements 46 and 49 and conduct current therebetween. The contacts 56 and 57 are extremely close to the contacts 46 and 49 but do not touch the same so that no friction is encountered and the rotor 58 may travel freely with reference to the fixed contacts. While the contacts 46, 56, 57 and 49 do not actually touch each other nevertheless the same serve as contacts in a switch mechanism and have hence been referred to as contacts. It can readily be comprehended, however, if desired, these contacts could actually be brought into engagement.

The transmission line 13 serves as a collector for the pulses discharged by switch mechanism 12 and consists of an annular conductor 61 semi-circular in cross section and which is disposed in the annular cavity 20 of casting 17. This conductor is arranged substantially in the center of the said cavity. The conductor 61 is supported on insulating bushings 62 which are threaded to receive studs 63. These studs are in turn screwed into the conductors as shown in Fig. 2. Bolts 64 are also screwed into these bushings and pass through openings 65 in the casting 17. Nuts 66 screwed on the ends of said bolts hold the parts mounted in proper position within the casting 17.

The charging units 15 are best shown in Fig. 2 and are similar in construction. For this reason only the single unit shown in cross section in this figure will be described. This unit consists of a ceramic bushing 68 mounted within a tube 69 of metal. Tube 69 is inserted in a bore 71 in casting 16 and is held in place by means of a set screw 72. The bushing 68 has a bore 73 and in which is received a core 74 of metal. A head 75 formed on the bushing 68 retains the bushing in proper relation with respect to the tube 69. The lower end 76 of the core 74 projects below the bushing 68 and tube 69 and is rounded as illustrated to form a contact or switch element for the discharge switch mechanism 12. There are 24 of the charging units 15 and the same are arranged in a circle concentric with the axis of the shaft 31 of the motor 11. To the upper end of the core 74 is connected a resistor 77 which in turn is connected to another resistor 78. This resistor in turn is connected to the terminal 48 of one of the screws 47. In this manner each of the units 15 is connected to one of the terminals 48 and provides one of the switch elements of the switch 12. The tube 68 and the core 74 form a capacitor indicated in its entirety by the reference numeral 40.

The switch mechanism 12 further includes a number of contacts or switch elements 81 which are screwed into the conductor 61 of the transmission line 13 and project upwardly therefrom. There are 24 of these contacts and the said contacts are arranged in a circle and lie directly opposite the contacts 76. Rotatably mounted between the contacts 76 and 81 is a disc 82 constructed of insulating material and similar to the disc 54. This disc is attached to a flange 83 formed on a bushing 84 and which is mounted on the shaft extension 33 of shaft 31. The said disc is secured to the flange by means of bolts 85, and nuts 86 screwed on these bolts clamp the parts in proper position. Mounted on the disc 82 are a number of connectors 87 which are constructed similarly to the connectors 59 and which have contacts 88 and 89 similarly disposed with reference to the contacts 76 and 81. There are 23 of the connectors 87 to correspond with the connectors 59 and the contacts 88 and 89 of said connectors are closely spaced with reference to the contacts 76 and 81. Terminals 91 and 92 are provided for the ends of the conductor 61 of the transmission line 13, as best shown in Fig. 3, and which are connected to cable connectors 93 and 94.

The wiring diagram of the invention is shown in Fig. 1 where the parts are diagrammatically illustrated. The disc 44 is connected by means of a conductor 95 to a source of variable direct current having a voltage of substantially 15,000 volts. The resistors 77 and 78 together form a resistance of between one and two megohms while the capacitors 40 may have a capacity of approximately twenty micro-microfarads. The transmission line 13 has a characteristic impedance of 52 ohms, the conductor 61 forming the central element of the transmission line and the housing 10 forming the shielding or outer portion of said transmission line. The housing 10 is grounded and an antenna may be connected to either or both of the terminals 93 and 94 by means of coaxial transmission line of the same impedance. The motor 11 operates at a speed of approximately 6,000 R. P. M.

The method of operation of the invention is as follows: The contacts 76 and 81 of the switch mechanism 12 are disposed between the contacts 46 and 49 of the switch mechanism 14 so that when the connectors 59 of switch mechanism 14 are conducting the connectors 87 of switch mechanism 12 are in non-conducting position. When the connectors 59 are conducting, current flows from the plate 44 through contacts 46 through connectors 59 and to contacts 49. At such time the circuit through connectors 87 are open and the capacitors 40 are being charged. Subsequently when the connectors 87 are in connecting position, connectors 59 are in open position and the capacitors 40 are discharged to the conductor 61. Thus a series of pulses are discharged to the said conductor. Due to the fact that there are 24 stationary contacts and 23 movable contacts, an exceedingly great repetition rate of the pulses is procured. Where the motor travels at 6,000 R. P. M. a repetition rate of 55,200 pulses per second is procured. The discharge of the charged condensers to a transmission line forms approximately rectangular voltage pulses of exceedingly short duration. In the construction shown, the inductance of discharge path is extremely low so that pulse widths of the order of 10 to the minus tenth power of a second can be produced, thus providing a spectrum essentially flat to 1,000 megacycles.

The advantages of the invention are manifest. Due to the narrowness of the pulses, the components thereof have frequencies extending over an extremely great range. In adidtion, a large peak power output is procured. In this manner noise pulses can be procured which will simulate most all forms of noise that is ordinarily encountered and which will provide effective means for testing in the elimination of the effects of noise in radio apparatus.

Changes in the specific form of the invention, as herein described, may be made within the scope of what is claimed without departing from the spirit of the invention.

Having described the invention, what is claimed as new and desired to be protected by Letters Patent is:

1. A noise generator comprising a plurality of capacitors, a distributor connected to a source of direct electric current and including a number of contacts one for each capacitor and arranged in a circle, a rotary charging switch mechanism acting between said contacts and capacitors and having a number of connectors for connecting said distributor to said capacitors, said connectors being arranged in a circle concentric with the circle of said contacts and rotating past the same, there being a different number of connectors than contacts, a collector having a number of contacts corresponding in number to the number of contacts of said distributor and arranged in a circle, a rotary discharge switch mechanism acting between said contacts and capacitors and having a number of connectors for connecting the contacts of said collector to said capacitors, said connectors being arranged in a circle concentric with the circle of the contacts of said collector and rotating past the same, said discharging switch mechanism having the same number of connectors as said charging switch mechanism and serving to successively cause the flow of current between said capacitors and collector and to discharge said capacitors to said collector.

2. A noise generator comprising a plurality of capacitors, a distributor connected to a source of direct electric current and including a number of contacts arranged in a circle, a rotary charging switch mechanism acting between said contacts and capacitors and having a number of connectors for connecting said distributor to said capacitors, said connectors being arranged in a circle concentric with the circle of said contacts and rotating past the same, there being a different number of connectors than contacts, a collector having a number of contacts corresponding in number to the number of contacts of said distributor and arranged in a circle, a rotary discharging switch mechanism acting between said contacts and capacitors and having a number of connectors for connecting the contacts of said collector to said capacitors, said connectors being arranged in a circle concentric with the circle of the contacts of said collector and rotating past the same, said discharging switch mechanism having the same number of connectors as said charging switch mechanism and serving to successively cause the flow of current between said capacitors and collector and to discharge said capacitors to said collector, the switch elements of said discharging switch mechanism being arranged to discharge when the corresponding switch elements of said charging switch mechanism is disconnected and to become disconnected when the corresponding switch elements of said charging switch mechanism are in charging position.

3. A noise generator for application to an antenna comprising a plurality of capacitors, a distributor connected to a source of direct electric current and including a number of contacts arranged in a circle, a rotary charging switch mechanism acting between said contacts and capacitors and having a number of connectors for connecting said distributor to said capacitors, said connectors being arranged in a circle concentric with the circle of said contacts and rotating past the same, there being a different number of connectors than contacts, a transmission line connected to said antenna and having a definite characteristic impedance related to the impedance of the antenna and arranged in the form of an open circle, contacts on said transmission line corresponding in number with the number of contacts of said distributor and arranged in a circle, a rotary discharging switch mechanism acting between said contacts and capacitors and having a number of connectors for connecting the contacts of said transmission line to said capacitors, said connectors being arranged in a circle concentric with the circle of the contacts of said collector and rotating past the same, said discharging switch mechanism having the same number of connectors as said charging switch mechanism and serving to successively cause the flow of current between said capacitors and collector and to discharge said capacitors to said collector.

References Cited in the file of this patent

UNITED STATES PATENTS

| Number | Name | Date |
|---|---|---|
| 1,194,154 | Eastham | Aug. 8, 1916 |
| 1,271,190 | Marconi | July 2, 1918 |
| 1,332,976 | Dowd | Mar. 9, 1920 |
| 1,366,160 | Kloneck | Jan. 18, 1921 |
| 1,508,162 | Chubb | Sept. 9, 1924 |
| 1,796,254 | Nyman | Mar. 10, 1931 |
| 2,047,463 | Dubilier | July 14, 1936 |
| 2,411,140 | Lindenblad | Nov. 12, 1946 |
| 2,417,452 | Stiefel | Mar. 18, 1947 |